United States Patent
Kim et al.

(10) Patent No.: US 9,923,695 B2
(45) Date of Patent: Mar. 20, 2018

(54) CALL PROCESSING METHOD AND APPARATUS FOR USE IN LTE SYSTEM

(71) Applicant: Samsung Electronics Co., Ltd., Suwon-si, Gyeonggi-do (KR)

(72) Inventors: Youngyong Kim, Suwon-si (KR); Taiho Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 14/861,381

(22) Filed: Sep. 22, 2015

(65) Prior Publication Data

US 2016/0088460 A1  Mar. 24, 2016

Related U.S. Application Data

(60) Provisional application No. 62/054,607, filed on Sep. 24, 2014.

(30) Foreign Application Priority Data

Dec. 10, 2014  (KR) .................... 10-2014-0177523

(51) Int. Cl.
  *H04W 8/08* (2009.01)
  *H04L 5/00* (2006.01)
  *H04L 29/06* (2006.01)

(52) U.S. Cl.
  CPC ............ *H04L 5/0055* (2013.01); *H04L 69/04* (2013.01); *H04L 69/22* (2013.01)

(58) Field of Classification Search
  CPC ........ H04W 8/08; H04W 28/06; H04L 69/04; H04L 29/0604
  See application file for complete search history.

(56) References Cited

U.S. PATENT DOCUMENTS

| 7,647,421 B2 | 1/2010 | Zhang et al. |
| 7,907,609 B2 | 3/2011 | Kapoor et al. |

(Continued)

FOREIGN PATENT DOCUMENTS

| KR | 10-2005-0058371 A | 6/2005 |
| KR | 10-2008-0083355 A | 9/2008 |

(Continued)

OTHER PUBLICATIONS

NTT Docomo et al., Clarification of the decompressor state and mode after PDCP re-establishment, 3GPP TSG-WG 2 Meeting #87 R2-143832 (Rel-12), XP050817203, Aug. 18-22, 2014.

(Continued)

*Primary Examiner* — Andrew Chriss
*Assistant Examiner* — Voster Preval
(74) *Attorney, Agent, or Firm* — Jefferson IP Law, LLP (57) ABSTRACT

A method for performing robust header compression (ROHC) of request for comments (RFC) 3095 over a packet data convergence protocol (PDCP) layer to compress and decompress voice over long term evolution (VoLTE) packets is provided. In the voice call operation, an evolved node B (eNB) receives an initialization and refresh (IR) packet transmitted by a user equipment (UE) and performs ROHC compression/decompression on the voice packet with a compressed header based on the information contained in the received IR packet. If the IR packet is lost, the eNB cannot establish the context for the voice packet, resulting in ROHC operation failure and a call drop problem. In order to maintain the voice call, the eNB sends the UE a static negative acknowledgement (SNACK) when a voice packet is received in the state where no context exists.

19 Claims, 8 Drawing Sheets

(56) References Cited

U.S. PATENT DOCUMENTS

| | | |
|---|---|---|
| 8,325,608 B2 | 12/2012 | Kumar et al. |
| 8,811,161 B2 | 8/2014 | Lee et al. |
| 2005/0201366 A1 | 9/2005 | Kim et al. |
| 2006/0187846 A1* | 8/2006 | Pelletier .............. H04W 28/06 370/252 |
| 2007/0165635 A1 | 7/2007 | Zhang et al. |
| 2008/0212566 A1 | 9/2008 | Kim et al. |
| 2009/0262687 A1* | 10/2009 | Furata ................. H04L 1/1664 370/328 |
| 2010/0232455 A1* | 9/2010 | Watanabe ............ H04W 28/06 370/477 |
| 2012/0189023 A1* | 7/2012 | Huang ................. H04L 1/0006 370/477 |
| 2013/0083702 A1 | 4/2013 | Barany et al. |
| 2013/0195056 A1 | 8/2013 | Liu et al. |
| 2013/0279380 A1* | 10/2013 | Hong ..................... H04H 20/72 370/310 |
| 2016/0241685 A1* | 8/2016 | Shah ....................... H04L 69/04 |
| 2017/0006139 A1* | 1/2017 | Kwon ................... H04L 49/201 |

FOREIGN PATENT DOCUMENTS

| | | |
|---|---|---|
| KR | 10-2009-0031186 A | 3/2009 |
| KR | 10-2009-0119709 A | 11/2009 |
| KR | 10-2011-0051236 A | 5/2011 |
| KR | 10-2013-0126844 A | 11/2013 |

OTHER PUBLICATIONS

Didier Barvaux, rohc_decomp.c, XP055306620, in \rohc-1.7.0.tar\rohc-1.7.0\rohc-1.7.01src\decomp of rohc-1.7.0. tar.xz, Jun. 21, 2014, pp. 1-113.

European Search Report dated Jan. 18, 2018, which issued in European Patent Application No. 15844154.3.

* cited by examiner

CALL PROCESSING METHOD AND APPARATUS FOR USE IN LTE SYSTEM

CROSS-REFERENCE TO RELATED APPLICATION(S)

This application claims the benefit under 35 U.S.C. § 119(e) of a U.S. Provisional application filed on Sep. 24, 2014 in the U.S. Patent and Trademark Office and assigned Ser. No. 62/054,607, and under 35 U.S.C. § 119(a) of a Korean patent application filed on Dec. 10, 2014 in the Korean Intellectual Property Office and assigned Serial number 10-2014-0177523, the entire disclosure of each of which is hereby incorporated by reference.

TECHNICAL FIELD

The present disclosure relates to voice over long term evolution (VoLTE). More particularly, the present disclosure relates to a method and apparatus for processing a voice call in an LTE system.

BACKGROUND

Voice over long term evolution (VoLTE) is a term used to indicate a technology capable of allowing for packet-based voice communication in a 3rd generation partnership project (3GPP) LTE/LTE-advanced (LTE-A) system. The VoLTE may allow for fast connection establishment and improved communication quality.

According to the 3GPP standard, the packet data convergence protocol (PDCP) layer performs robust header compression (ROHC) of request for comments (RFC) 3095 to compress and decompress the VoLTE packets. In the voice call operation, an evolved node B (eNB) receives an initialization and refresh (IR) packet transmitted by a user equipment (UE) and performs ROHC compression/decompression on the voice packet with a compressed header based on the information contained in the received IR packet.

The above information is presented as background information only to assist with an understanding of the present disclosure. No determination has been made, and no assertion is made, as to whether any of the above might be applicable as prior art with regard to the present disclosure.

SUMMARY

The robust header compression (ROHC) standard specifies a packet loss recovery mechanism however, omits an initialization and refresh (IR) packet recovery mechanism. Thus, if the IR packet is lost, the evolved node B (eNB) cannot establish the context for the voice packet, resulting in ROHC operation failure and undesirable call drop problems. There is therefore a need of a method for maintaining the ongoing voice call in the above situation.

Aspects of the present disclosure are to address at least the above-mentioned problems and/or disadvantages and to provide at least the advantages described below. Accordingly, an aspect of the present disclosure is to provide a method and apparatus for processing a voice call in a long term evolution (LTE) system.

In accordance with an aspect of the present disclosure, a voice call processing method of a base station is provided for in an LTE system. The voice call processing method includes receiving a packet associated with a voice call from a terminal, determining whether the packet is an IR packet, determining, when the packet is not an IR packet, whether a context for ROHC decompression exists in the base station, transmitting, when no context exists, a negative acknowledgement (NACK) to the terminal; and receiving the IR packet from the terminal.

In accordance with another aspect of the present disclosure, a base station for processing a voice call is provided for an LTE system. The base station includes a transceiver which transmits and receives signals and a controller which controls receiving a packet for a voice call from a terminal, determining whether the packet is an IR packet, determining, when the packet is not an IR packet, whether a context for ROHC decompression exists in the base station, transmitting, when no context exists, a NACK to the UE, and receiving the IR packet from the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to the orthogonal frequency division multiplexing-based (OFDM-based) radio communication system, particularly the 3rd generation partnership project long term evolution (3GPP LTE), it will be understood by those skilled in the art that the present disclosure can be applied even to other communication systems having the similar technical background and channel format, with a slight modification, without departing from the spirit and scope of the present disclosure.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments, or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to various embodiments of the present disclosure, means, but is not limited to, a software or hardware component, such as a field programmable gate array (FPGA) or application specific integrated circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

Figure 1:
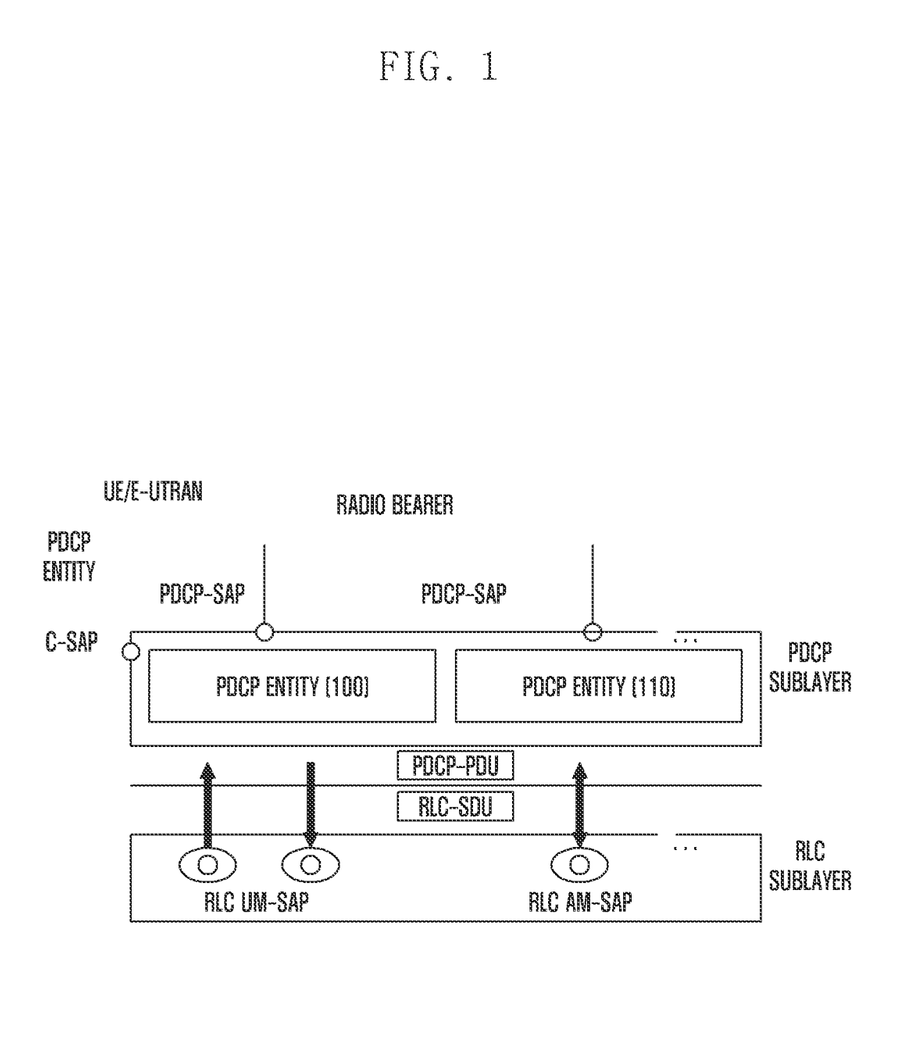
FIG. 1 is a diagram illustrating the packet data convergence protocol (PDCP) layer according to an embodiment of the present disclosure.

FIG. 1 is a diagram illustrating a structure of the packet data convergence protocol (PDCP) layer according to an embodiment of the present disclosure.

Referring to FIG. 1, the PDCP layer is one of the layers constituting the radio network protocol architecture and included in both the user plane and control plane. The PDCP layer works on top of the radio link control (RLC) layer and the PDCP entities 100 and 110 are established for the respective bearers.

Figure 2:
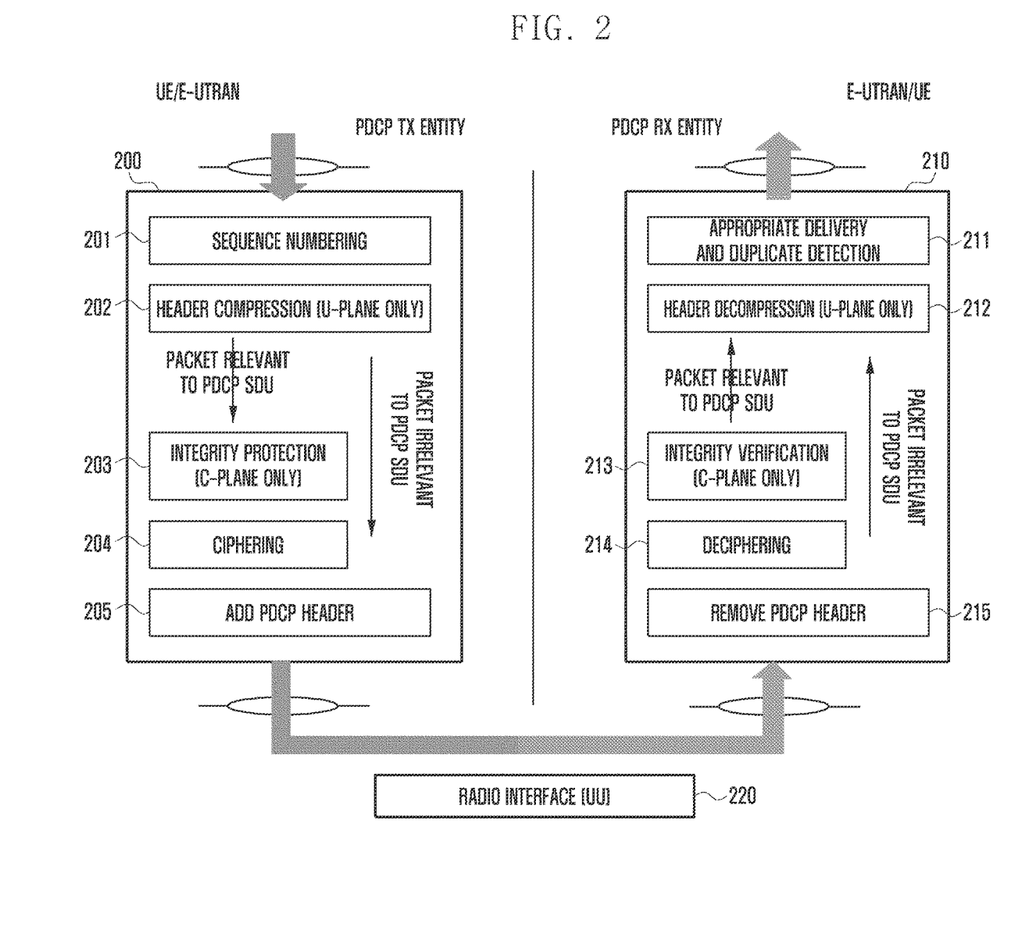
FIG. 2 is a diagram illustrating functionalities of the PDCP layer according to an embodiment of the present disclosure.

FIG. 2 is a diagram illustrating functionalities of the PDCP layer according to an embodiment of the present disclosure.

Referring to FIG. 2, a PDCP packet generated at the PDCP layer 200 of the transmitter arrives at the PDCP layer 210 of the receiver via the radio interface 220. At this time, the PDCP layer may exist in the user equipment (UE) or the evolved universal mobile telecommunications system (UMTS) terrestrial radio access network (E-UTRAN).

The PDCP layer of the transmitter adds a sequence number to the packet as denoted by reference number 201 and compresses the packet header (in the case of the user plane) as denoted by reference number 202. The packet relevant to the PDCP service data unit (SDU) passes through the integrity protection (in the case of the control plane) process 203 and the ciphering process 204 while the packet irrelevant to the PDCP SDU does not pass through the integrity protection and ciphering processes. A PDCP header is added to the packet passed through the above processes and then transmitted.

The PDCP layer of the receiver removes the PDCP header of the received packet as denoted by reference number 215, performs deciphering on the packet relevant to the PDCP SDU as denoted by reference number 214, and performs an integrity check (in the case of the control plane) as denoted by reference number 213. The packet irrelevant to the PDCP SDU bypasses the integrity check and deciphering processes. The PDCP layer decompresses the packet header (in the case of the user plane) as denoted by reference number 212 and determines whether the packet is a valid one or a duplicate as denoted by reference number 211, the valid packet being delivered to the higher layer.

The header compression function of the PDCP layer is performed with a standardized method called ROHC for compressing various protocol headers such as Internet protocol (IP), user datagram protocol (UDP), real-time transport protocol (RTP), and transmission control protocol (TCP) headers. The ROHC scheme is not specified in the 3GPP LTE standard but in the RFC 3095 standard. The overhead of IP, UDP, and RTP is 40 bytes for IP version 4 (IPv4) or 60 bytes for IPv6 and it degrades the efficiency of communication services, especially the voice over IP (VoIP) service, in the bandwidth-constrained radio communication system.

According to RFC 3095, the packet is transferred from a compressor to a decompressor. The ROHC technique of RFC 3095 is characterized by defining a packet stream with static and dynamic header fields, transferring all of the fields from the compressor to the decompressor, storing the content of the static fields in the compressor and decompressor, and transferring only changed parts of the contents of the dynamic fields to reduce the size of the header to be actually transmitted. For example, the IPv6 header includes the static fields such as a version field, a flow level field, a next header field, a source address field, and a destination address field; and the dynamic fields such as a traffic class field and a hop limit field. The decompressor is capable of receiving and storing the changed part of the dynamic fields and recovering the original header through decompression based on the context stored previously.

The context is the information for use, at the compressor and decompressor, in compressing/decompressing the header. The context includes the relevant information including the compression and decompression reference information and the information about changes in the fields.

The ROHC compressor operates in one of the three states: initialization and refresh (IR) state as the lowest compression state, first order (FO) state, and second order (SO) state as the highest compression state.

An IR state is the state where the compressor is initialized or reconfigured to restart the static part of the context. The compressor transmits the complete header information including the static and dynamic fields that are not compressed as well as supplementary information. The packet transmitted in this state is called an IR packet.

The FO state is the state where the compressor recognizes and stores the static fields such as IP addresses and port numbers of both ends of the connection and transmits the changed parts of the dynamic fields. T For example, the FO state is the state where the dynamic fields are partially compressed as well as all of the static fields.

In the SO state, the compressor compresses all of the dynamic fields such as RTP sequence and transmits only the logical sequence number and checksum for verifying the next packet. In an exemplary embodiment, all of the static fields and most of the dynamic fields are compressed in the FO state and all of the dynamic fields are compressed with the sequence number and checksum in the SO state.

Also, the decompressor is in one of three states: no context state as the lowest compression state, static context state, and full context state as the highest compression state.

Figure 3:
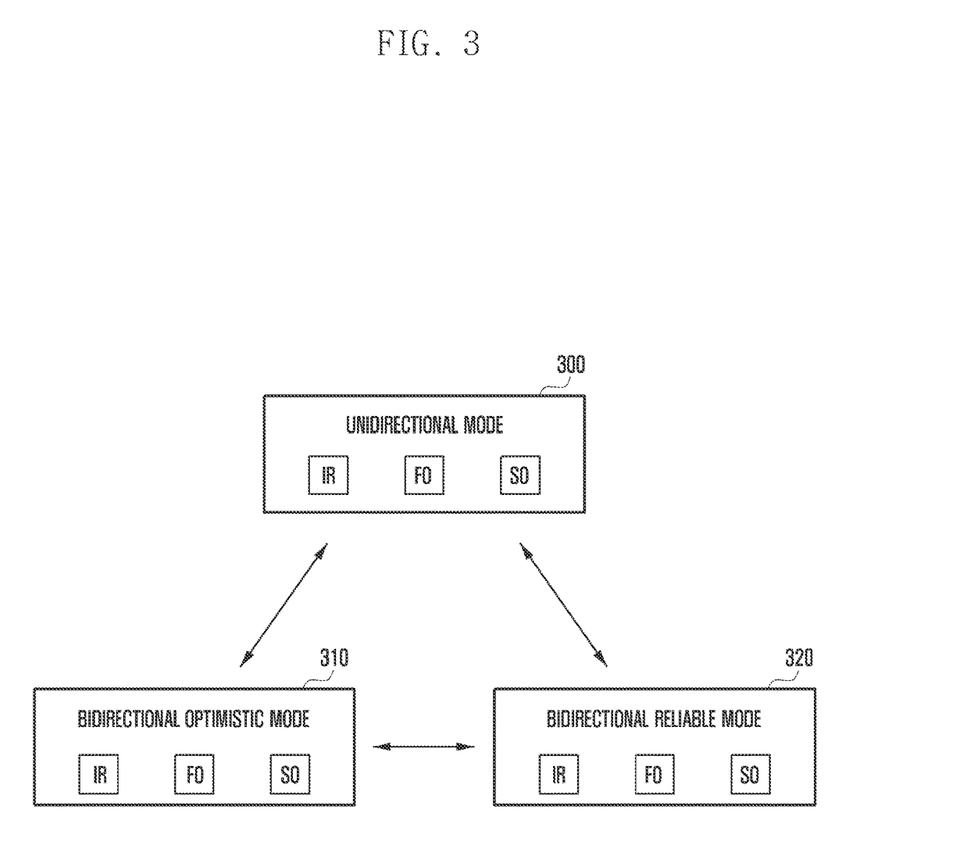
FIG. 3 is a diagram illustrating robust header compression (ROHC) mode transition according to an embodiment of the present disclosure.

FIG. 3 is a diagram illustrating ROHC mode transition according to an embodiment of the present disclosure.

Referring to FIG. 3, there are three ROHC operation modes: unidirectional mode (U-mode) 300, bidirectional optimistic mode (O-Mode) 310, and bidirectional reliable mode (R-mode) 320. The compressor may be in one of the IR, RO, and SO states per operation mode.

In U-mode, the packets are transmitted only in the direction from the compressor to the decompressor. In addition, the U-mode is used when there is no path from the decompressor to the compressor or it is impossible to use the path. In ROHC, the compression operation starts in U-mode and the mode transition to a bidirectional mode is triggered by a feedback packet indicating that the mode transition is required after the packet is received by the decompressor.

The O-mode is similar to the U-mode with the exception that there is a feedback channel for use in transmitting an acknowledgement message corresponding to the error recovery request and important context update from the decompressor to the compressor. The O-mode is characterized by use of the feedback sporadically while maximizing the compression efficiency.

The R-mode differs from the above two operation mode in various aspects. The important differences are the concentrated use of the feedback channel and adoption of the strict use to avoid the loss of context synchronization. In R-mode, feedback is provided for every context update.

According to the 3GPP standard, the VoLTE operates in RLC unacknowledged mode (UM) and uses a 7-bit PDCP sequence number. The RLC UM is the operation mode in which a header is added but no acknowledgement of receipt is required.

Figure 4:
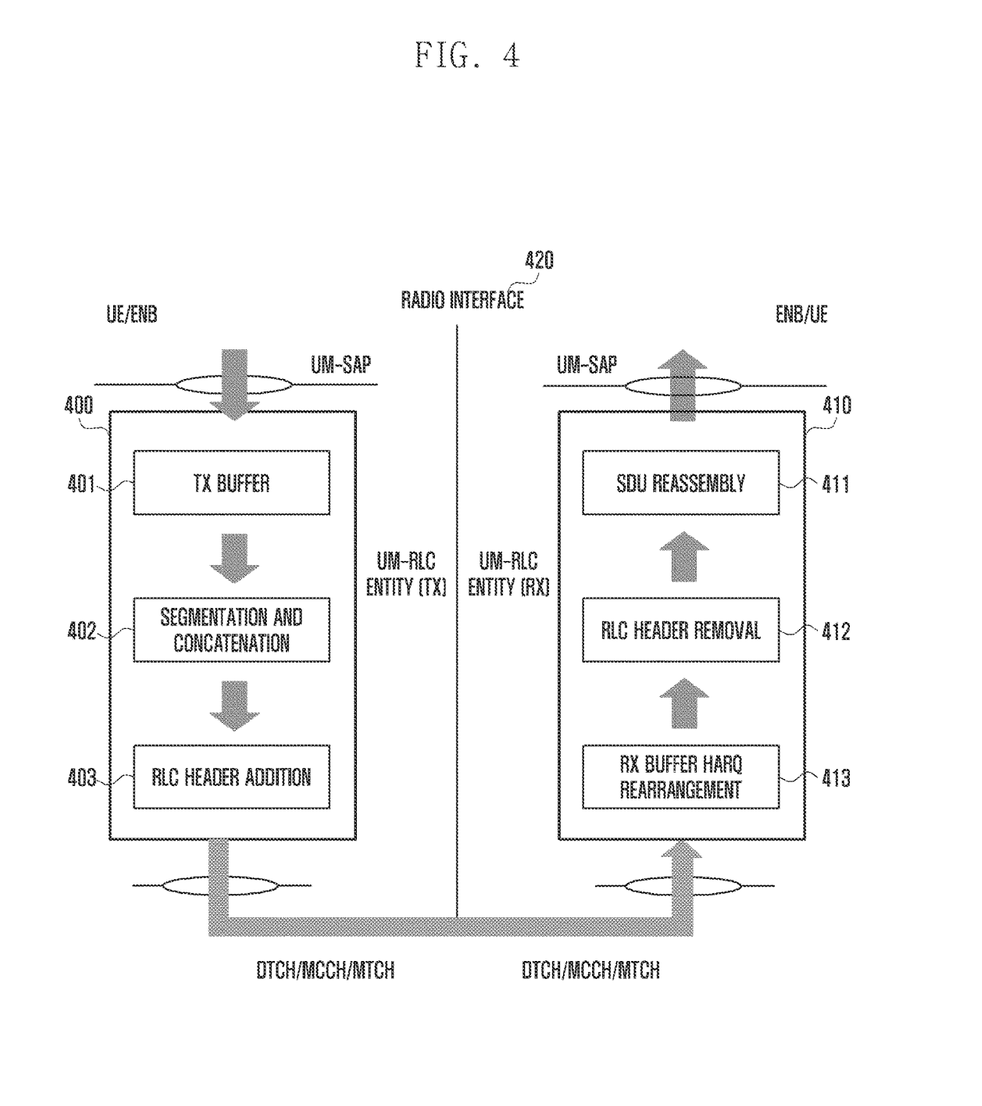
FIG. 4 is a diagram illustrating data flow in the radio link control unacknowledged mode (RLC UM) according to an embodiment of the present disclosure.

FIG. 4 is a diagram illustrating data flow in the RLC UM according to an embodiment of the present disclosure.

Referring to FIG. 4, an RLC UM packet transmitted by the RLC UM entity of the RLC layer 400 of the transmitter is received by the RLC UM entity of the RLC layer 410 of the receiver through the radio interface 420. In an exemplary embodiment, the RLC layer exists in the UE and the eNB.

The RLC entity 400 of the transmitter buffers the data (SDUs) from a higher layer (PDCP or radio resource control (RRC) layer) in a transmission buffer as denoted by reference number 401. The RLC entity 400 segments and/or concatenates the SDUs into RLC protocol data units (PDUs) as denoted by reference number 402. The RLC entity 400 adds an RLC header to the RLC PDUs as denoted by reference number 403. The RLC PDUs generated in this way are transferred to a lower layer so as to be transmitted to the receiver.

The RLC entity 410 of the receiver buffers the RLC PDUs delivered from the lower layer in the reception buffer and performs hybrid automatic-repeat-request (HARQ) rearrangement as denoted by reference number 413. The RLC entity 410 removes the RLC header from the RLC PDU as denoted by reference number 412 and assembles the PDUs into higher layer protocol SDUs as denoted by reference number 411. The SDUs generated in this way are delivered to a higher layer (for example, the PDCP or RRC layer).

Since no acknowledgement (ACK)/negative Acknowledgement (NACK) message is required in the RLC UM, the voice packet transmitted in uplink may be lost unlike the radio communication environment in which the packet is retransmitted according to the acknowledgement message. Particularly, the decompressor has to receive the IR packet which includes the information for use in performing ROHC decompression on the voice packet received since then.

Right after the connection is established, the ROHC starts operation in U-mode according to the RFC 3095. However, the U-mode is the operation mode without feedback channel and, although any feedback channel exists, allows only for use of the positive ACK. This means that it is impossible to receive a NACK when the IR packet is lost on the uplink and thus the UE does not know of the IR packet loss, resulting in no retransmission of the IR packet. If the IR packet is lost, the decompressor of the eNB cannot generate the context of voice packets so as not to perform an ROCH operation, resulting in a call drop.

Figure 5:
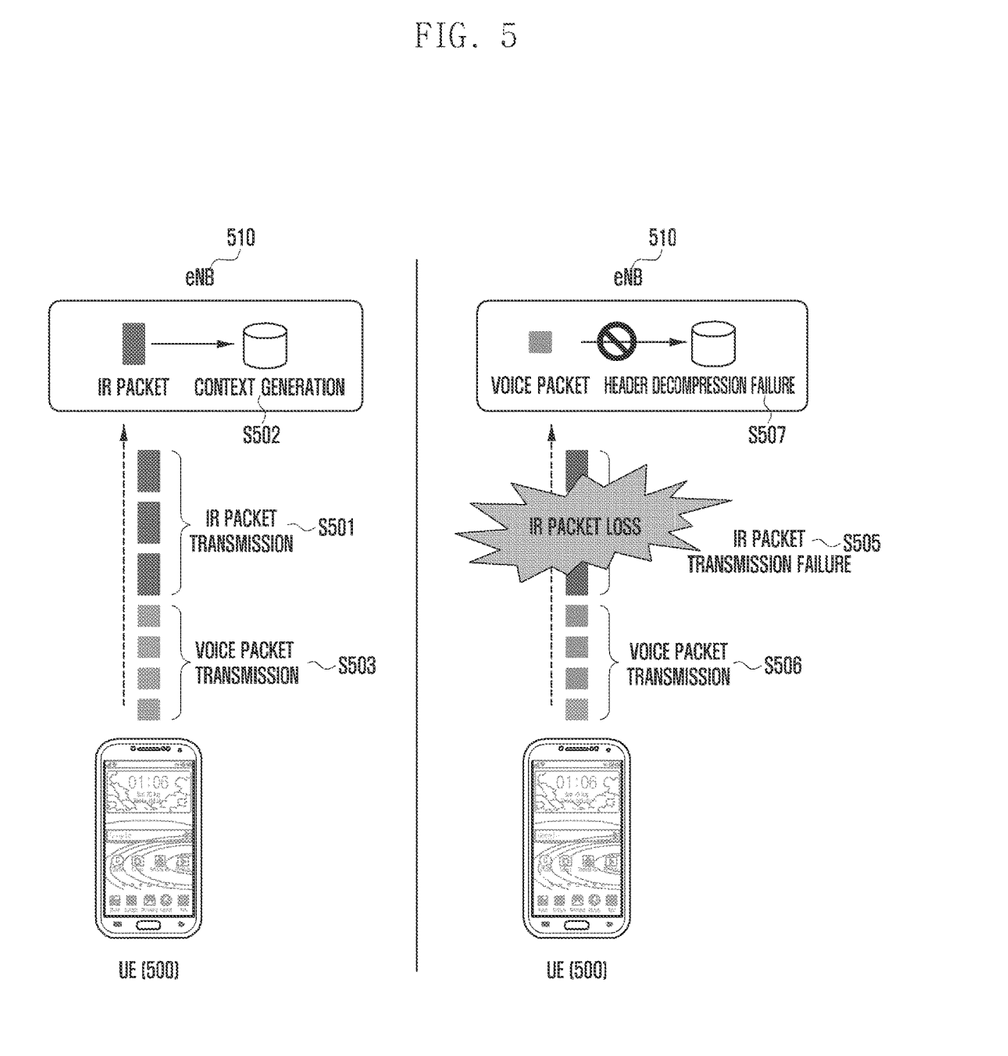
FIG. 5 is a diagram associated with the call drop problem caused by initialization and refresh (IR) packet loss according to an embodiment of the present disclosure.

FIG. 5 is a diagram for explaining the call drop problem caused by IR packet loss according to an embodiment of the present disclosure.

Referring to FIG. 5, the UE 500 sends the eNB 510 the IR and voice packets. The UE transmits the IR packets to the eNB as denoted by reference number S501 and the eNB generates a context based on the IR packets as denoted by reference number S502. The eNB 500 receives the voice packets with a compressed header as denoted by reference number S503 and performs header decompression based on the generated context.

If the IR packets transmitted by the UE are lost as denoted by reference number S505, the eNB cannot generate the context associated with the lost IR packets. For example, the eNB attempts to decompress the compressed header of the voice packets transmitted, as denoted by reference number S506, after the IR packets resulting in a header decompression failure denoted by reference number S507. When a header decompression failure occurs, a call drop may result.

In order to protect against the VoLTE call drop caused by IP packet loss, the present disclosure proposes a method for detecting IP packet loss and maintain the ongoing voice call.

Figure 6:
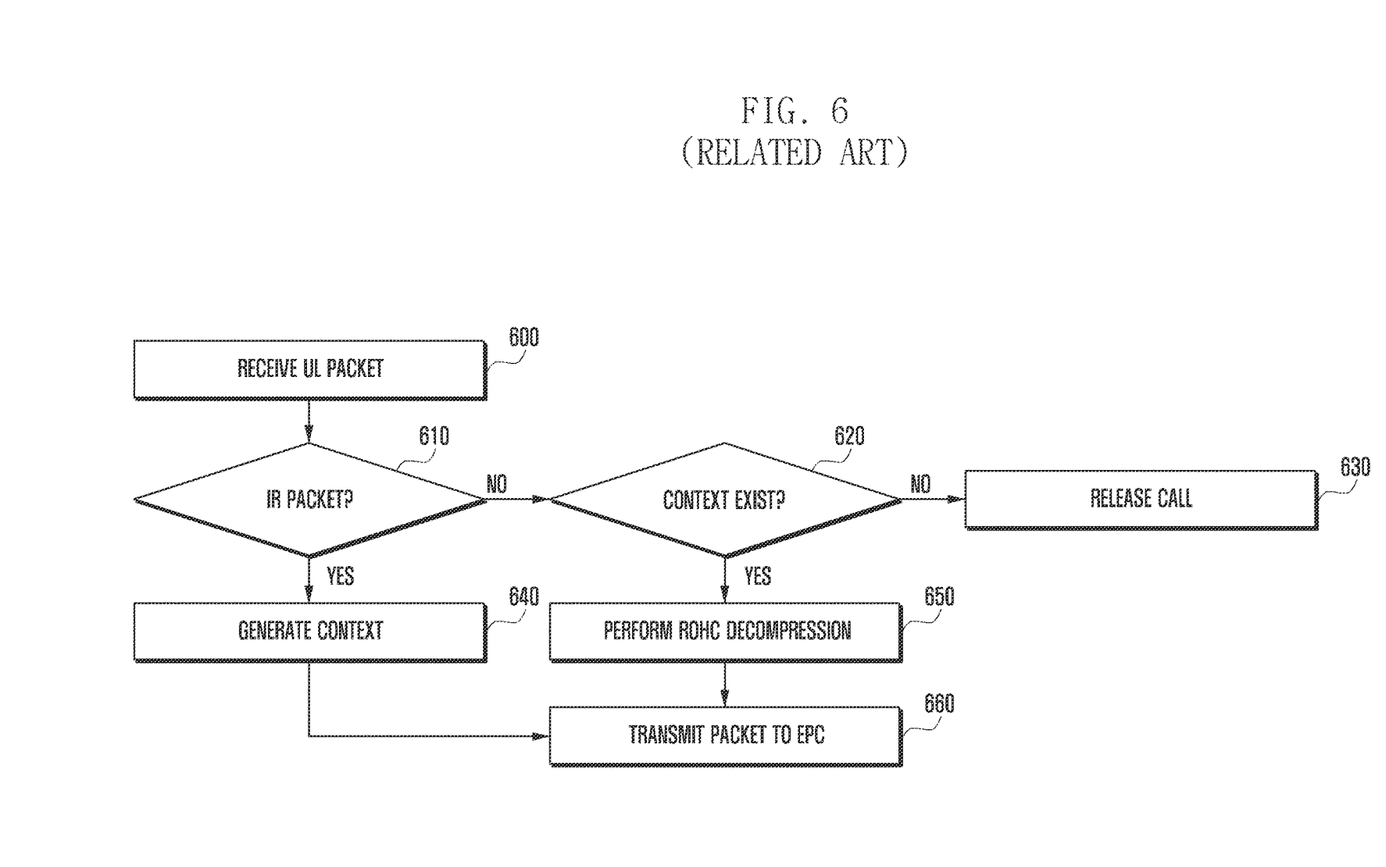
FIG. 6 is a flowchart illustrating a voice over long term evolution LTE (VoLTE) packet reception method according to the related art.

FIG. 6 is a flowchart illustrating a VoLTE packet reception method according to the related art.

Referring to FIG. 6, the eNB receives an uplink VoLTE packet at operation 600. The eNB determines whether the received packet is an IR packet at operation 610 and, if so, generates a context at operation 640. If the received packet is not an IR packet, the eNB determines whether the context exists at operation 620. If the context exists, the eNB performs ROHC decompression to decompress the compressed header of the received packet at operation 650 and, otherwise if no context exists, releases the call at operation 630. After generating the context, the eNB transmits the IR packet used for generating the context at operation 640 or the packet of which the header has been decompressed at operation 650 to the evolved packet core (EPC) at operation 660.

If the IR packet transmitted by the UE is lost, the eNB receives the compressed-header voice packet with the compressed header without context creation. If the voice packet is received, the UE determines whether the context exists at operation 620 (because the received packet is not an IR packet) and releases the call at operation 630 (because there is no context). This means that the call is released when the IR packet transmitted by the UE is lost.

Figure 7:
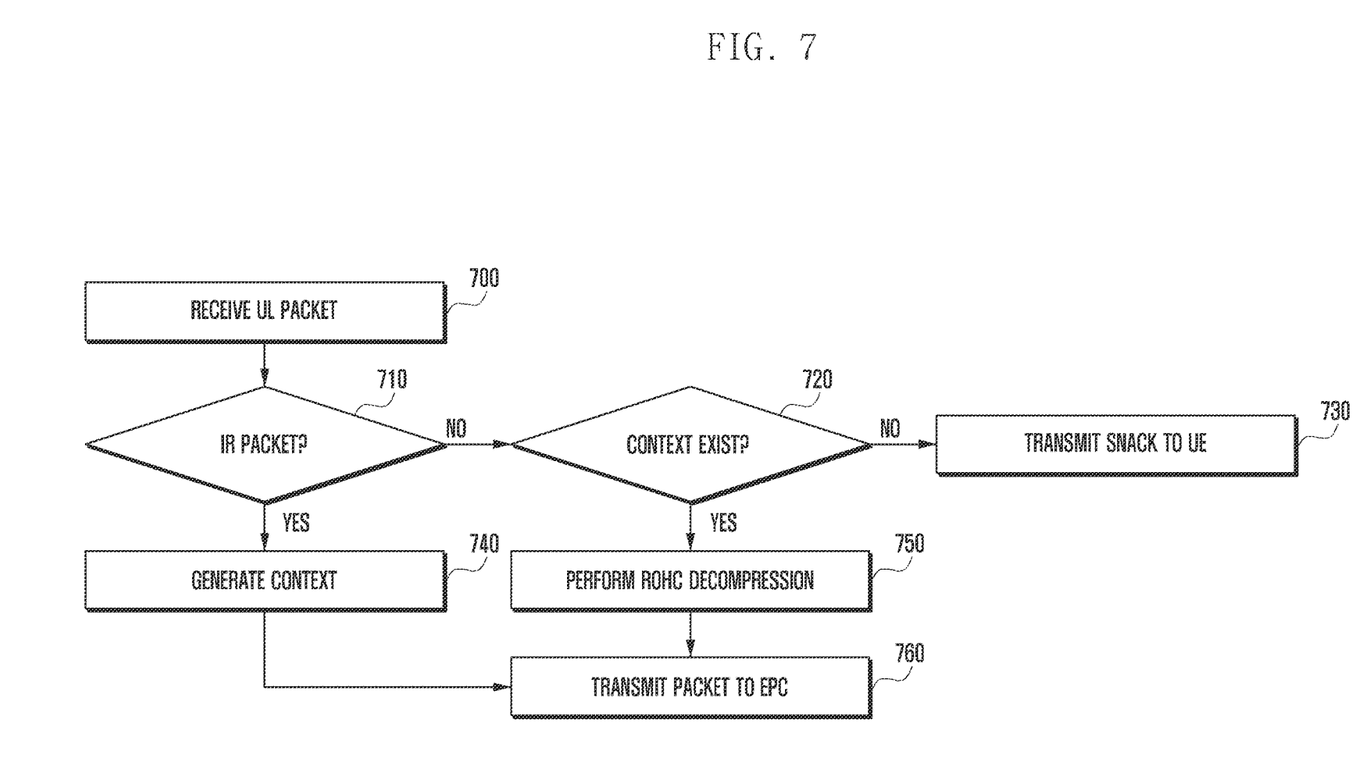
FIG. 7 is a flowchart illustrating an enhanced VoLTE packet reception method according to an embodiment of the present disclosure.

In order to prevent the call from being dropped as at operation 630 of FIG. 6, the present disclosure proposes an enhanced packet reception method as depicted in FIG. 7.

FIG. 7 is a flowchart illustrating an enhanced VoLTE packet reception method according to an embodiment of the present disclosure.

Referring to FIG. 7, the eNB receives an uplink VoLTE packet at operation 700. The eNB determines whether the received packet is an IR packet at 710 and, if so, generates a context at operation 740. If the received packet is not an IR packet, determines whether the context exists at operation 720. If the context exists, the eNB performs ROHC decompression to decompress the compressed header of the received packet at operation 750 and, otherwise if no context exists, sends the UE a static NACK (SNACK) at operation 730. After generating the context, the eNB transmits the IR packet used for generating the context at operation 740 or the packet of which header has been decompressed at operation 750 to the EPC at operation 760.

The enhanced packet reception method of FIG. 7 differs from the conventional packet reception method in that the eNB transmits the SNACK instead of releasing the call when the received packet is not an IR packet and there is no context. The SNACK is a negative acknowledgement transmitted from the decompressor to the compressor when it is determined that the static context is damaged in the O-mode and R-Mode.

If the SNACK is received, the compressor transitions from the FO state to the IR state and transmits the IR packet to the decompressor. If the UE retransmits the IR packet, the eNB generates the context based on the IR packet according to the packet reception method of FIG. 7 so as to decompress the compressed header of the voice packet following the IR packet, resulting in maintenance of the call.

Figure 8:
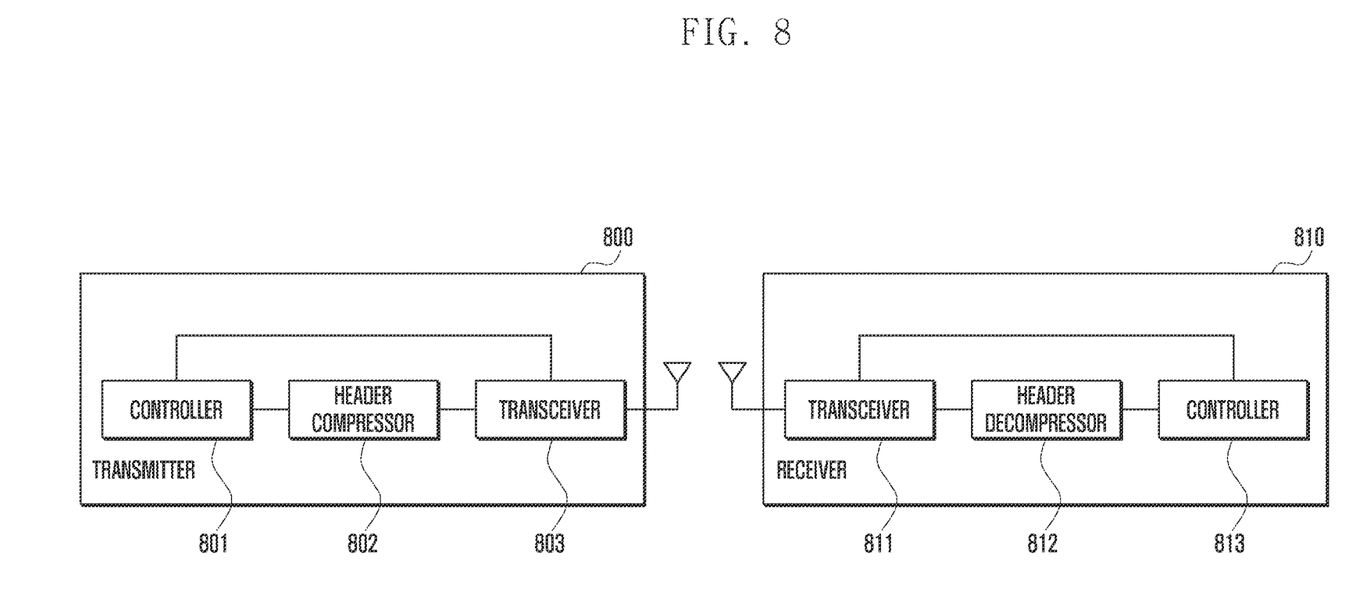
FIG. 8 is a block diagram illustrating the configurations of the transmitter and receivers according to an embodiment of the present disclosure.

FIG. 8 is a block diagram illustrating the configurations of the transmitter and receivers according to an embodiment of the present disclosure.

Referring to FIG. 8, the receiver 810 includes a controller 813, a header compressor 812, and a transceiver 811. The transceiver 811 transmits and receives signals. The controller 813 is configured to receive a packet for the voice call from the UE, determine whether the packet is an IR packet, determine, when the packet is not an IR packet, whether the eNB has the context relevant to the ROHC decompression, and transmit, when the eNB has no context, a NACK to the UE.

The controller 811 may also control receiving the IR packet from the UE and generating the context based on the received IR packet. The controller 811 may be further configured to receive the voice packet having a compressed header from the UE and to decompress the compressed header based on the context.

If the packet for the voice call is an IR packet, the controller 811 may also be configured to generate the context based on the packet for the voice call and, if the eNB has the context, decompresses the compressed header of the voice packet received from the UE based on the context.

Such header decompression may be performed by the header decompressor 812 under the control of the controller 811.

The transmitter 800 includes a controller 801, a header compressor 802, and a transceiver 803. The transceiver transmits and receives signals and the controller 801 controls the transceiver to transmit the packet relevant to the voice call. The controller 801 may also control the transceiver 803 to transmit the IR packets and voice packets, receive the SNACK from the receiver, and retransmit the IR packet when the SNACK is received.

As described above, the present disclosure is advantageous in terms of allowing the UE to maintain the ongoing voice call even when the IR packet transmitted by the eNB is lost.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A voice call processing method of a base station in a long term evolution (LTE) system, the method comprising:
   receiving a packet for a voice call from a terminal;
   determining whether the packet is an initialization and refresh (IR) packet;
   determining whether a context for robust header compression (ROHC) decompression exists in the base station, upon determining that the packet is not the IR packet; and
   transmitting a negative acknowledgement (NACK) to the terminal, upon determining that no context for ROHC decompression exists.

2. The method of claim 1, further comprising:
   receiving the IR packet from the terminal, upon transmitting the NACK to the terminal.

3. The method of claim 2, further comprising:
   generating the context for ROHC decompression based on the IR packet.

4. The method of claim 3, further comprising:
receiving a voice packet having a compressed header from the terminal; and
decompressing the compressed header of the voice packet based on the context for ROHC decompression.

5. The method of claim 1, further comprising:
generating the context for ROHC decompression, upon determining that the packet is the IR packet.

6. The method of claim 5, further comprising:
receiving a voice packet from the terminal; and
decompressing a compressed header included in the voice packet based on the context for ROHC decompression.

7. The method of claim 1, wherein the NACK is a static NACK.

8. A base station for processing a voice call in a long term evolution (LTE) system, the base station comprising:
a transceiver configured to transmit and receive signals; and
a controller configured to:
receive a packet for a voice call from a terminal,
determine whether the packet is an initialization and refresh (IR) packet,
determine whether a context for robust header compression (ROHC) decompression exists in the base station, upon determining that the packet is not the IR packet, and
transmit a negative acknowledgement (NACK) to the terminal, upon determining that no context for ROHC decompression exists.

9. The base station of claim 8, wherein the controller is further configured to receive the IR packet from the terminal, upon transmitting the NACK to the terminal.

10. The base station of claim 9, wherein the controller is further configured to generate the context for ROHC decompression based on the IR packet.

11. The base station of claim 10, wherein the controller is further configured to:
receive a voice packet having a compressed header from the terminal, and
decompress the compressed header of the voice packet based on the context for ROHC decompression.

12. The base station of claim 8, wherein the controller is further configured to generate the context for ROHC decompression upon determining that the packet is the IR packet.

13. The base station of claim 12, wherein the controller is further configured to:
receive a voice packet from the terminal; and
decompress a compressed header included in the voice packet based on the context for ROHC decompression.

14. The base station of claim 8, wherein the NACK is a static NACK.

15. A voice call processing method in a long term evolution (LTE) system, the voice call method comprising:
establishing communication between a terminal and a base station;
transmitting, by the terminal, a first packet associated with a voice call to the base station;
receiving, by the terminal, a negative acknowledgement (NACK) message from the base station, indicating that the base station had not received an initialization and refresh (IR) packet corresponding to the first packet; and
transmitting the IR packet corresponding to the first packet,
wherein the receiving of the NACK message is further based on whether a context for robust header compression (ROHC) decompression exists in the base station.

16. The method of claim 15, further comprising:
transmitting a second packet different from the first packet from the terminal to the base station.

17. The method of claim 16, wherein the second packet is a voice packet with a compressed header.

18. The method of claim 15, wherein the base station generates context based on the IR packet.

19. The method of claim 15, further comprising:
maintaining the communication between the terminal and the base station after the NACK message is received from the base station.

* * * * *